US008191411B2

(12) United States Patent
Bossemeyer et al.

(10) Patent No.: US 8,191,411 B2
(45) Date of Patent: Jun. 5, 2012

(54) DEVICE AND METHOD FOR MONITORING A FUEL METERING SYSTEM

(75) Inventors: Hans Georg Bossemeyer, Stuttgart (DE); Michael Hackner, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 575 days.

(21) Appl. No.: 11/992,106

(22) PCT Filed: Sep. 11, 2006

(86) PCT No.: PCT/EP2006/066234
§ 371 (c)(1),
(2), (4) Date: Mar. 26, 2009

(87) PCT Pub. No.: WO2007/031492
PCT Pub. Date: Mar. 22, 2007

(65) Prior Publication Data

US 2009/0199627 A1 Aug. 13, 2009

(30) Foreign Application Priority Data

Sep. 15, 2005 (DE) ......................... 10 2005 043 971

(51) Int. Cl.
*G01M 15/09* (2006.01)

(52) U.S. Cl. ........................... 73/114.43; 73/40; 73/49.7

(58) Field of Classification Search ......... 73/40, 40.5 R, 73/46, 47, 49.7, 114.38, 114.41, 114.42, 73/114.43, 114.51
See application file for complete search history.

(56) References Cited

U.S. PATENT DOCUMENTS

| | | | | |
|---|---|---|---|---|
| 6,712,045 | B1 * | 3/2004 | McCarthy, Jr. | 123/456 |
| 8,074,627 | B2 * | 12/2011 | Siddiqui | 123/520 |
| 2002/0112528 | A1 * | 8/2002 | Antonioli et al. | 73/49.7 |
| 2006/0225714 | A1 * | 10/2006 | Kano et al. | 123/520 |

FOREIGN PATENT DOCUMENTS

| | | |
|---|---|---|
| DE | 195 20 300 | 12/1996 |
| DE | 197 27 794 | 1/1999 |
| DE | 198 38 222 | 2/2000 |
| EP | 0 974 826 | 1/2000 |
| EP | 1 118 761 | 7/2001 |
| EP | 1 347 165 | 9/2003 |
| JP | 57-65822 | 4/1982 |
| JP | 10 089135 | 4/1998 |
| JP | 11-183309 | 7/1999 |
| JP | 2000-303886 | 10/2000 |
| JP | 2002-221069 | 8/2002 |

* cited by examiner

*Primary Examiner* — Eric S McCall
(74) *Attorney, Agent, or Firm* — Kenyon & Kenyon LLP

(57) ABSTRACT

A method and device for monitoring a fuel metering system, in which fuel is pumped from a low-pressure zone into a high-pressure zone. The pressure in the high-pressure zone is detected. An error is recognized on the basis of the pressure variation in the high-pressure zone. The type of error is recognized on the basis of the shape of a pressure drop curve. The variation of the pressure quantity over time is approximated using a function such as the hyperbolic function. The type of error is recognized on the basis of the quantity characterizing the function.

5 Claims, 3 Drawing Sheets

DEVICE AND METHOD FOR MONITORING A FUEL METERING SYSTEM

BACKGROUND INFORMATION

German Patent No. DE 195 20 300 describes a device for detecting a leak in a fuel supply system in an internal combustion engine, in particular in a compression-ignition internal combustion engine. In the device described therein, the fuel is conveyed by at least one fuel pump under pressure from a fuel reservoir into a so-called high-pressure zone. From the high-pressure zone the fuel reaches the individual combustion chambers of the internal combustion engine via injectors. The pressure in the high-pressure zone is usually detected by a pressure sensor. This pressure sensor is normally used for setting or regulating the pressure in the high-pressure zone. In the related art the pressure is analyzed by detecting the pressure variation and comparing it with an expected pressure variation. In the event of a difference between an expected pressure variation and the actual pressure variation, the device detects a leak.

The disadvantage in this type of error monitoring is that what is detected is only whether or not a leak has occurred.

SUMMARY OF THE INVENTION

According to the present invention it is recognized that different errors result in different pressure variations. In particular, it is recognized that leaks differ by the type of flow. A distinction is made in particular between laminar and turbulent flows. Furthermore, pressure-dependent leak widenings or leak shrinkages are possible. This means that the cross-section area of the leak opening varies as a function of the pressure. This provides the possibility of recognizing the type of leak from the shape of the pressure drop curve. By associating the measured pressure variation with predefined pressure variations which occur in the event of certain types of leaks or in the event of a defect of different components, the error may be reliably associated with a certain type of error and therefore with the defective component. This means that the type of error and thus the defective component may be reliably recognized from the pressure curve. In particular this procedure makes a considerably more reliable leak detection possible. Using the conventional procedure, in the event of a difference, a leak is also detected in each case. Using the invention, certain pressure curves not resulting from a leak but that would be identified as a leak in the related art are reliably recognized as such. Unnecessary error responses such as, for example, replacement of components, may thus be avoided.

It is particularly advantageous if the variation of the pressure quantity over time is approximated using a function. This approximation of the pressure variation provides at least one or multiple quantities characterizing the function. This means that characteristic quantities which best approximate the pressure variation are ascertained. The type of error or the defective component is recognized from these characteristic quantities.

DETAILED DESCRIPTION

Figure 1:
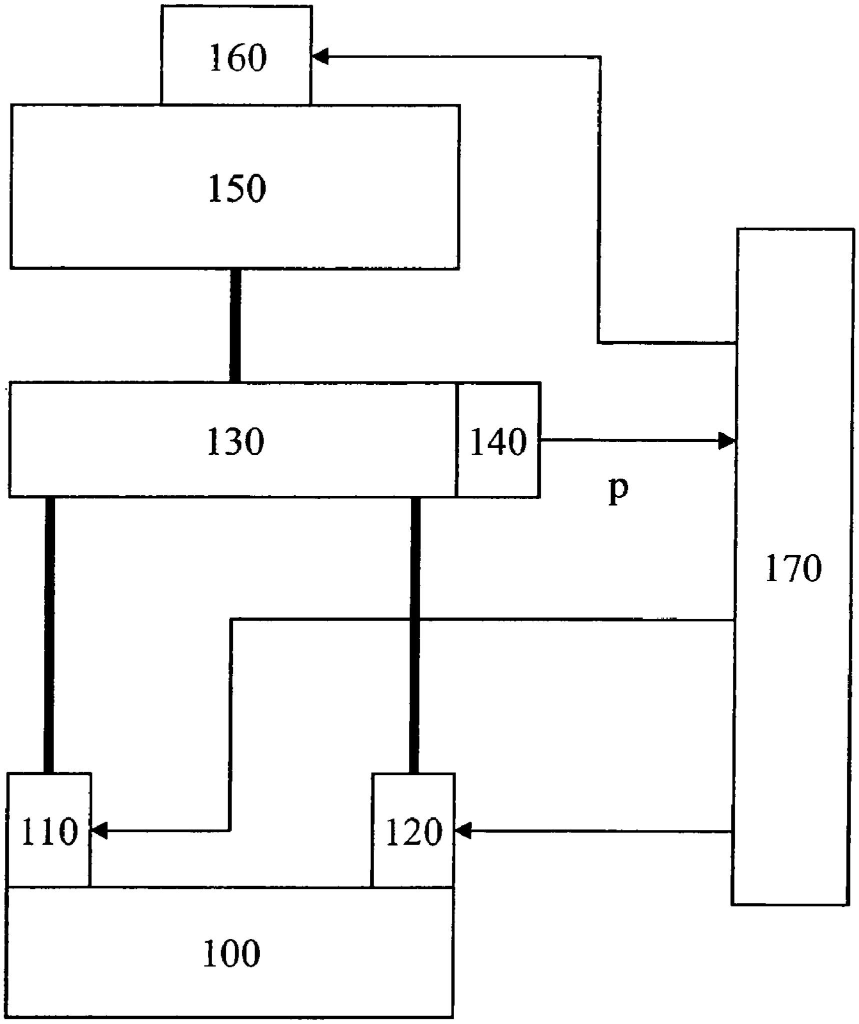
FIG. 1 shows the elements of a fuel metering system as a block diagram.

FIG. 1 shows the important elements of a fuel metering system, of a diesel engine in particular, as an example. The internal combustion engine is labeled with the reference numeral 100. It is supplied with fuel via a first injector 110 and a second injector 120. Injectors 110 and 120 are connected to a rail 130 via fuel lines. At least one sensor 140, which outputs a pressure quantity p characterizing the pressure in the high-pressure zone, is situated on the rail.

This pressure quantity is also referred to hereinafter as rail pressure. Instead of the output signal of sensor 140, other quantities characterizing the rail pressure may also be similarly analyzed.

Rail 130 receives fuel from a high-pressure pump 150. This high-pressure pump is associated with an actuating element 160 for controlling the quantity of fuel pumped by high-pressure pump 150, and thus the rail pressure. This actuating element 160, as well as injectors 110 and 120, receive activation signals from a control unit 170. The control unit also processes output signal p of sensor 140. Normally the rail and the line between high-pressure pump 150 and the injectors are referred to as a high-pressure zone and the zone upstream from the high-pressure pump is referred to as a low-pressure zone.

In the illustrated specific embodiment, only two injectors are illustrated. The procedure is applicable to any number of injectors. For the sake of clarity, only two injectors are illustrated. Further actuating elements may also be provided. Thus, in particular, a further actuating element may be provided for controlling the rail pressure. Such an actuating element may be designed as a solenoid valve, for example, which connects the high-pressure zone with the low-pressure zone. Furthermore, the control unit analyzes the signals of further sensors and activates further actuating elements for controlling internal combustion engine 100. Furthermore, the procedure is not restricted to a system having one rail. It may also be used in systems having a plurality of rails or in systems without a rail. Instead of the rail pressure, a quantity corresponding to the rail pressure is then to be analyzed.

High-pressure pump 150 pumps the fuel from the low-pressure zone which includes the tank in particular into a high-pressure zone which contains rail 130 in particular. The quantity of pumped fuel and thus the rail pressure may be set with the aid of first actuating element 160. This is preferably accomplished via a regulator, which is part of control unit 170. For this purpose, control unit 170 detects rail pressure p via sensor 140, compares it with a setpoint value, and activates actuating element 160 as a function of the difference between the setpoint value and the actual value. The fuel reaches the internal combustion engine from the high-pressure zone via injectors 110 and 120. The injectors contain essentially an actuator which may be designed as a solenoid valve or as a piezoelectric actuator. Control unit 170 sends signals to injectors 110 and 120 such that the fuel is supplied to the internal combustion engine at a predefined point in time or at a predefined angular position of the crankshaft in a predefined quantity.

A plurality of errors may occur in such a system. It may happen that a leak occurs in the high-pressure zone, i.e., from the high-pressure zone fuel reaches the low-pressure zone or the environment. Furthermore, it may happen that an increased fuel quantity reaches the internal combustion engine via the injectors. Such errors must be reliably detected. Normally these errors are detected and signaled to the driver and/or stored in the control unit and output during maintenance. If such an error occurs, the error must be searched for in a complicated manner during maintenance. It has been recognized according to the present invention that the error may be associated with a certain component of the system using the pressure variation. In particular it has been recognized that different pressure variations occur in the event of leaks of different components.

It is now provided according to the present invention that the pressure variation is analyzed and compared with stored pressure variations in particular. With the aid of this comparison, on the one hand, the leak is reliably detected; on the other hand, the leak is associated with a certain component.

Figure 2:
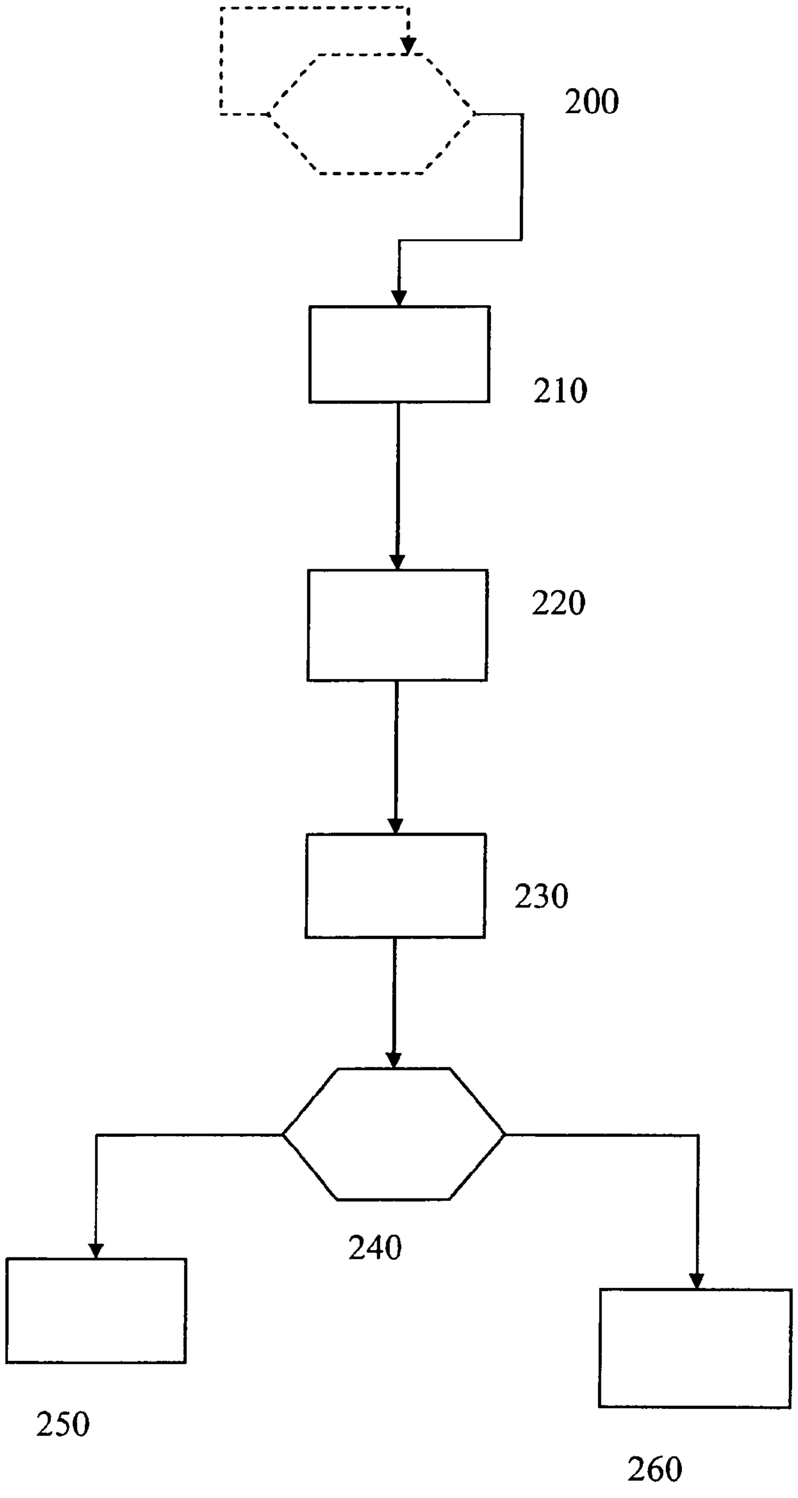
FIG. 2 shows the procedure according to the present invention.

FIG. 2 shows the procedure according to the present invention in detail as a flow chart. A check is made in a first step 200 of whether an operating state exists in which a test is possible. If this is not the case, query 200 occurs after a waiting time. If query 200 detects that a test is possible, conditions that are necessary for the test are produced in a targeted manner in step 210. Among other things, a test pressure is applied to the high-pressure zone in step 210. Furthermore, it is ensured by activating the actuating elements for regulating the rail pressure, in particular actuating element 160, and by activating injectors 110 and 120, that no more fuel is pumped into or from the rail. If additional actuators are provided, these must also be activated in an appropriate manner. In step 220 the pressure variation is then plotted against time or against the rotation of the crankshaft. Subsequently in step 230 the exponent of the pressure drop curve is ascertained. It has been recognized according to the present invention that, in the event of a leak, the pressure-dependent leak flows and pressure change rates follow power functions of the pressure. Accordingly, in the event of a leak, the pressure drop over time or over the angular position of the crankshaft approximately follows a so-called hyperbolic function with exponent. In the special case of a laminar flow without pressure-dependent leak gap widening or leak gap shrinkage, the pressure drop over time approximately follows an exponential function.

This means that different pressure values are detected at different points in time or at different angular positions of the crankshaft or the camshaft. Subsequently the power function of the pressure change rate against the pressure with which the power function comes closest to the measured values is ascertained. Any approximation procedures are usable, in particular the adjustment of a hyperbolic or exponential function to the pressure variation over time.

It has been recognized according to the present invention that different flows, in particular flows with and without pressure-dependent leak gap widening, have different exponents. There are different errors corresponding to leak flows with and without pressure-dependent leak gap widening. This means that the type of error may be recognized and thus associated with a certain component or a small number of components via the exponent. This association takes place in query 240, where, for example, a first error 250 or a second error 260 is detected as a function of the value of the exponent. This is preferably accomplished by storing the values of the exponent for different errors and/or for the error-free state in a characteristic map or in a characteristic curve or in a table. Query 240 then checks to which of these stored values the measured exponent comes closest and associates the exponent with a stored value. The corresponding error may then be read from the table on the basis of the stored exponent. Normally a certain range of values of the exponent is associated with an error type.

Alternatively to the hyperbolic function, other functions which describe the pressure drop over time or the angular position may also be used. In particular, the variation may be approximated by a straight line. In this case, a quantity which characterizes the steepness of the pressure drop may be used, for example.

According to the present invention, any functions may be used for describing the pressure variation and any quantities characterizing this function may be used for identifying the error type or the defective component. Exponential functions are also suitable in particular.

Figure 3:
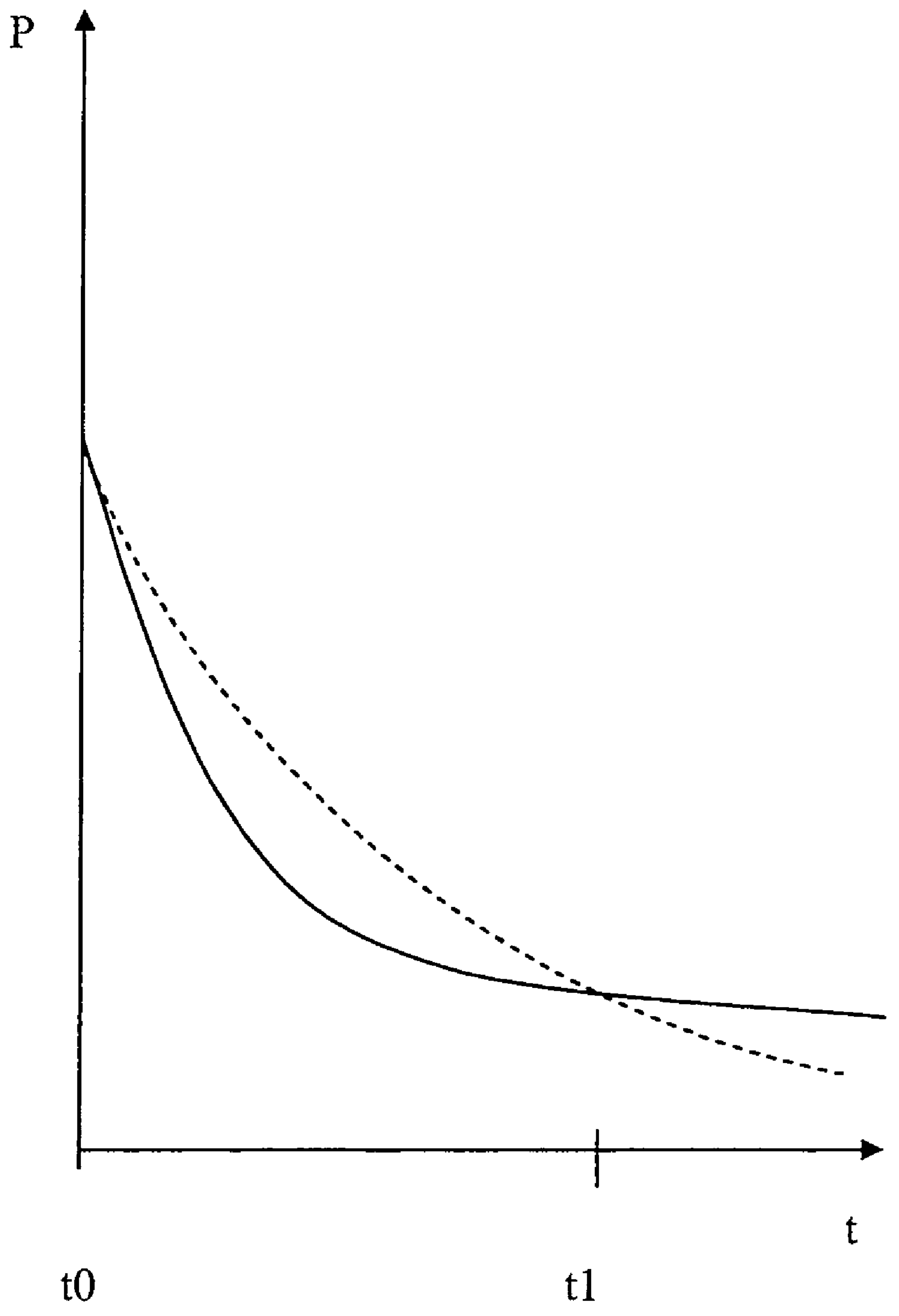
FIG. 3 shows different pressure variations plotted against time.

FIG. 3 shows, as an example, two curves of the rail pressure with and without pressure-dependent leak gap widening plotted against time. This figure shows that, in monitoring the pressure value at a certain point in time t1, the pressure has dropped to the same value for different pressure variations. By analyzing the pressure at one or a few points in time, the error cannot always be associated with a component or an error type.

What is claimed is:

1. A method for monitoring a fuel metering system comprising:

pumping fuel from a low-pressure zone into a high-pressure zone;

detecting over time a pressure quantity characterizing a pressure in the high-pressure zone;

recognizing a flow leak when a variation of the pressure quantity over time approximates a hyperbolic function with exponent; and ascertaining, on the basis of the exponent of the hyperbolic function, the type of leak flow.

2. The method according to claim 1, wherein the ascertaining of the type of leak flow includes ascertaining whether the leak flow is a first type of leak flow with pressure-dependent leak gap widening or a second type of leak flow without pressure-dependent leak gap widening.

3. The method according to claim 2, wherein the first type of leak flow is associated with a first set of components and the second type of leak flow is associated with a second set of components, and wherein the first type of leak flow indicates a defect in at least one of the first set of components and the second type of leak flow indicates a defect in at least one of the second set of components.

4. A device for monitoring a fuel metering system in which fuel is pumped from a low-pressure zone into a high-pressure zone, comprising:

means for detecting over time a pressure quantity characterizing a pressure in the high-pressure zone;

means for recognizing a flow leak when a variation of the pressure quantity over time approximates a hyperbolic function with exponent; and means for ascertaining, on the basis of the exponent of the hyperbolic function, the type of leak flow.

5. The device according to claim 4, wherein the ascertaining of the type of leak flow includes ascertaining whether the leak flow is a first type of leak flow with pressure-dependent leak gap widening or a second type of leak flow without pressure-dependent leak gap widening.

* * * * *